United States Patent
Asano

(10) Patent No.: US 11,485,822 B2
(45) Date of Patent: Nov. 1, 2022

(54) METHOD OF PRODUCING POLYAMIDE FINE PARTICLES, AND POLYAMIDE FINE PARTICLES

(71) Applicant: Toray Industries, Inc., Tokyo (JP)

(72) Inventor: Itaru Asano, Nagoya (JP)

(73) Assignee: Toray Industries, Inc., Tokyo (JP)

( * ) Notice: Subject to any disclaimer, the term of this patent is extended or adjusted under 35 U.S.C. 154(b) by 399 days.

(21) Appl. No.: 16/606,837

(22) PCT Filed: May 7, 2018

(86) PCT No.: PCT/JP2018/017616
§ 371 (c)(1),
(2) Date: Oct. 21, 2019

(87) PCT Pub. No.: WO2018/207728
PCT Pub. Date: Nov. 15, 2018

(65) Prior Publication Data
US 2020/0048413 A1    Feb. 13, 2020

(30) Foreign Application Priority Data

May 12, 2017  (JP) .............. JP2017-095286
Jan. 31, 2018  (JP) .............. JP2018-014437

(51) Int. Cl.
*C08G 69/46*  (2006.01)
*C08G 69/16*  (2006.01)

(52) U.S. Cl.
CPC ............. *C08G 69/16* (2013.01); *C08G 69/46* (2013.01)

(58) Field of Classification Search
CPC ... C08L 77/00; C08L 77/02; C08J 3/12; C08J 3/14; C08J 2377/02; C08G 18/603
See application file for complete search history.

(56) References Cited

U.S. PATENT DOCUMENTS 2,742,440 A * 4/1956 Stott .................. C08J 3/14
528/495
4,694,063 A 9/1987 Hilaire et al.
6,127,513 A * 10/2000 Ohara .................. C08J 3/16
528/323
2014/0114045 A1 4/2014 Kawasaki et al.
2016/0272776 A1 9/2016 Arai et al.
2017/0349714 A1 12/2017 Nogues et al.

FOREIGN PATENT DOCUMENTS

| JP | 60-40134 A | 3/1985 |
|---|---|---|
| JP | 61-181826 A | 8/1986 |
| JP | 8-73602 A | 3/1996 |
| JP | 10-316750 A | 12/1998 |
| JP | 2000-248028 A | 9/2000 |
| JP | 2002-80629 A | 3/2002 |
| JP | 2003-171682 A | 6/2003 |
| JP | 2007-119632 A | 5/2007 |
| JP | 2010-53272 A | 3/2010 |
| JP | 2016-186068 A | 10/2016 |
| WO | 2012/161174 A1 | 11/2012 |
| WO | 2016/102879 A1 | 6/2016 |

OTHER PUBLICATIONS

Mojsiewicz-Pienkowska Size exclusion chromatography with evaporative light scattering detection as a method for speciation analysis of polydimethylsiloxanes.III.Identification and determination of dimeticone and simeticone in pharmaceutical formulations, Journal of Pharmaceutical and Biomedical Analysis, Sep. 2011.*
Crespy et al (Anionic Polymerization of e-Caprolactam in miniemulsion: Synthesis and Characterization of Polyamide-6 Nanoparticles, Macromolecules 2005, 38, 6882-6887, published on Oct. 2005).*

* cited by examiner

*Primary Examiner* — Gregory Listvoyb
(74) *Attorney, Agent, or Firm* — DLA Piper LLP (US)

(57) ABSTRACT

A method produces polyamide fine particles by polymerizing a polyamide monomer (A) in the presence of a polymer (B) at a temperature equal to or higher than the crystallization temperature of a polyamide to be obtained, wherein the polyamide monomer (A) and the polymer (B) are homogeneously dissolved at the start of polymerization, and polyamide fine particles are precipitated after the polymerization. Polyamide fine particles have a number average particle size of 0.1 to 100 μm, a sphericity of 90 or more, a particle size distribution index of 3.0 or less, a linseed oil absorption of 100 mL/100 g or less, and a crystallization temperature of 150° C. or more. In particular, a polyamide having a high crystallization temperature includes fine particles having a smooth surface, a narrow particle size distribution, and high sphericity.

7 Claims, 3 Drawing Sheets

METHOD OF PRODUCING POLYAMIDE FINE PARTICLES, AND POLYAMIDE FINE PARTICLES

TECHNICAL FIELD

This disclosure relates to a method of producing polyamide fine particles by a simple method, and polyamide fine particles including a polyamide having a high crystallization temperature, a smooth surface, a narrow particle size distribution, and a high sphericity.

BACKGROUND

Polyamide fine particles are used in a variety of applications such as powder paints, taking advantage of characteristics such as high toughness, flexibility, and high heat resistance. In particular, polyamide 12 fine particles made of polyamide 12, having a true spherical shape, solid without pores inside, and having a smooth surface can give favorable touch feeling derived from a smooth surface shape in addition to the flexibility of a resin itself, and are used for high-quality cosmetics or paints.

On the other hand, since a polyamide resin with higher crystallization temperature such as polyamide 6 or polyamide 66, which has higher versatility and melting point than polyamide 12, may be widely used for higher heat-resistant applications and the like, irregular and porous fine particles or fine particles with a wide particle size distribution are produced.

Examples of a method of producing polyamide 6 fine particles include a method of dissolving porous polyamide 6 in a solvent and then adding a non-solvent and water to produce porous polyamide 6 fine particles (Japanese Patent Application Laid-Open Publication No. 2002-80629 and Japanese Patent Application Laid-Open Publication No. 2010-053272). Other examples include a method in which polyamide is strongly stirred in a medium such as polyethylene glycol at a temperature equal to or higher than the melting point, and a method in which a polycondensation reaction is performed using a polyamide raw material in a silicone oil medium (Japanese Patent Application Laid-Open Publication No. S60-040134 and Japanese Patent Application Laid-Open Publication No. H10-316750). In another method, anionic polymerization is performed in a paraffin medium to provide irregular polyamide 6 fine particles (Japanese Patent Application Laid-Open Publication No. S61-181826). A method of producing polyamide 6 fine particles by anionic polymerization in which a medium is changed to an aromatic halogen compound and a hydrocarbon polymer solution is also disclosed (Japanese Patent Application Laid-Open Publication No. H08-073602).

However, since the techniques of Japanese Patent Application Laid-Open Publication No. 2002-80629 and Japanese Patent Application Laid-Open Publication No. 2010-053272 lower the solubility in a solvent and precipitate polyamide, porous fine particles are produced.

In the techniques of Japanese Patent Application Laid-Open Publication No. S60-040134 and Japanese Patent Application Laid-Open Publication No. H10-316750, since particles are produced from raw materials that are not mixed, only fine particles having a wide particle size distribution can be produced.

Regarding the techniques of Japanese Patent Application Laid-Open Publication No. S61-181826 and Japanese Patent Application Laid-Open Publication No. H08-073602 by anionic polymerization, since an initiator is an ignitable and flammable medium and solvent are used, it is difficult to polymerize at a high temperature, and the solubility decreases and the polyamide precipitates in the solvent and, therefore, irregularly shaped fine particles are produced. Furthermore, to remove a variety of media, solvents, and polymers, a complicated process in which a large amount of organic solvent is necessary is required.

It could therefore be helpful to provide a method of producing polyamide fine particles by a simple method, and polyamide fine particles made of polyamide with high crystallization temperature, smooth surface, narrow particle size distribution, and high sphericity.

SUMMARY

I thus provide:

A method produces polyamide fine particles by polymerizing a polyamide monomer (A) in the presence of a polymer (B) at a temperature equal to or higher than the crystallization temperature of a polyamide to be obtained, wherein the polyamide monomer (A) and the polymer (B) are homogeneously dissolved at the start of polymerization, and polyamide fine particles are precipitated after the polymerization.

The polyamide fine particles have the following constitution: that is, polyamide fine particles having a number average particle size of 0.1 to 100 μm, a sphericity of 90 or more, a particle size distribution index of 3.0 or less, a linseed oil absorption of 100 mL/100 g or less, and a crystallization temperature of 150° C. or more.

Preferably, polyamide fine particles are produced further in the presence of a solvent (C) of the monomer (A) and the polymer (B).

Preferably, the square of the solubility parameter difference between the monomer (A) and the polymer (B) is 0.1 to 25, and the square of the solubility parameter difference between polyamide and the polymer (B) is 0.1 to 16.

Preferably, the solvent (c) is water.

Preferably, the polymer (B) does not include a polar group, or includes any one selected from a hydroxyl group and a sulfhydryl group.

Preferably, the polymer (B) is at least one selected from the group consisting of polyethylene glycol, polypropylene glycol, polytetramethylene glycol, polyethylene glycol-polypropylene glycol copolymer, and an alkyl ether thereof.

Preferably, the molecular weight of the polymer (B) is 500 to 500,000.

In the polyamide fine particles, preferably, polyamide constituting the polyamide fine particles is any one selected from polyamide 6, polyamide 66, and a copolymer thereof.

Preferably, the weight average molecular weight of polyamide constituting the polyamide fine particles is 8,000 or more.

In the production method, it is possible to produce polyamide having a high crystallization temperature as fine particles having a true sphere and a smooth surface by a safe and simple method. Such polyamide fine particles have high heat resistance and chemical resistance inherent in polyamides with a high crystallization temperature, as well as slipperiness due to a true spherical shape and smooth surface with a narrow particle size distribution, and therefore can be suitably utilized for paints, adhesives, inks, toner light diffusing agents, liquid crystal spacers, matting agents, additives for polymer alloy, carriers for a variety of catalysts, chromatographic carriers, automotive parts, aircraft parts, electronic parts, cosmetic additives, medical carriers and the like. The polyamide fine particles can be applied to a high-performance paint that can be used under harsh conditions under which a conventional paint is unusable or the like due to heat resistance derived from a high crystallization temperature, a true spherical and smooth surface form, and a uniform particle diameter. Furthermore, in cosmetic applications, the amide group concentration in polyamide is increased so that the moisture retention is increased, and it is possible to achieve both a smooth and uniform feeling and a moist feeling due to the true spherical shape and uniform particle size.

DETAILED DESCRIPTION

Figure 1:
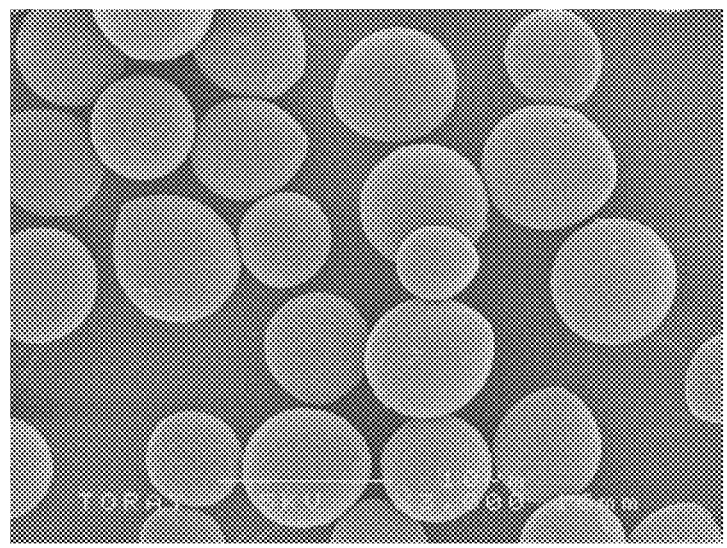
FIG. 1 is a scanning electron micrograph of polyamide fine particles obtained in Example 1.

Hereinafter, my methods and fine particles will be described in detail.

My method produces polyamide fine particles by polymerizing a polyamide monomer (A) in the presence of a polymer (B) at a temperature higher than the crystallization temperature of the polyamide obtained by polymerizing the monomer (A), characterized in that the polyamide monomer (A) and the polymer (B) are homogeneously dissolved at the start of polymerization, and polyamide fine particles are precipitated after the polymerization, whereby polyamide fine particles that have true spherical shape, have a smooth surface, are fine, and have a narrow particle size distribution can be obtained also for a polyamide with high crystallization temperature and higher melting point, which has been difficult to obtain by a conventional method.

Whether or not the polyamide monomer (A) at the start of polymerization is uniformly dissolved in the polymer (B) may be visually confirmed by checking whether or not a solution in a reaction vessel is transparent. When the polyamide monomer (A) and the polymer (B) are in a state of a suspension or being separated into two phases at the start of polymerization, they are incompatible and require formation of aggregates, strong stirring or the like. In this example, polymerization may be started after a solvent (C) is further used to homogenize the polyamide monomer (A) and the polymer (B). Whether or not the polyamide fine particles are precipitated after the polymerization may be visually confirmed by checking whether or not a liquid in a reaction vessel is a suspension. When the polyamide and the polymer (B) are a homogeneous solution at the end of polymerization, they are uniformly compatible and become aggregates or porous fine particles by cooling or the like.

The polyamide constituting the polyamide fine particles refers to a polymer having a structure containing an amide group, and is produced by a polycondensation reaction of an amino acid which is a monomer (A) of polyamide, anionic ring-opening polymerization with a lactam and an initiator, cationic ring-opening polymerization or ring-opening polymerization after hydrolysis with water, a polycondensation reaction of a dicarboxylic acid and a diamine or a salt thereof or the like. In a lactam, since a homogeneous liquid with the monomer (A) or the polymer (B) by an initiator is not formed and the initiator is ignitable, polymerization at a temperature equal to or higher than the crystallization temperature of a polyamide in which polyamide fine particles that have true spherical shape and have smooth surface can be easily obtained is difficult and, therefore, ring-opening polymerization with cationic polymerization or water is preferable, and polymerization at a temperature equal to or higher than the crystallization temperature of a polyamide to be obtained is most preferably carried out by ring-opening polymerization with water or the like from the viewpoints of coloring the polyamide with an initiator and suppressing cross-linked products or gel products.

Specific examples of the polyamide monomer (A) used as a raw material for the polyamide fine particles in the method include a mixture selected from an amino acid such as aminohexanoic acid, aminoundecanoic acid, aminododecanoic acid, or paramethylbenzoic acid, a lactam such as ε-caprolactam and laurolactam, a dicarboxylic acid such as oxalic acid, succinic acid, adipic acid, suberic acid, azelaic acid, sebacic acid, undecanedioic acid, dodecanedioic acid, terephthalic acid, isophthalic acid, 1,4-cyclohexanedicarboxylic acid, or 1,3-cyclohexanedicarboxylic acid and a diamine such as ethylenediamine, trimethylenediamine, tetramethylenediamine, pentamethylenediamine, hexamethylenediamine, heptamethylenediamine, octamethylenediamine, nonamethylenediamine, decanediamine, undecanediamine, dodecanediamine, 1,4-cyclohexanediamine, 1,3-cyclohexanediamine, 4,4'-diaminodicyclohexylmethane, or 3,3'-dimethyl-4,4'-diaminodicyclohexylmethane, and a salt thereof. Two or more of these monomers (A) may be used as long as they do not impair the desired result, and another monomer capable of copolymerization may be included. From the viewpoint that the solubility of the monomer (A) and the polymer (B) is improved, and the resulting polyamide fine particles have a fine particle size and a narrow particle size distribution, aminohexanoic acid, ε-caprolactam, hexamethylenediamine, and adipic acid are preferred, aminohexanoic acid and ε-caprolactam are further preferred, and ε-caprolactam is most preferred.

Specific examples of the polyamide produced by polymerizing the monomer (A) include polycaproamide (polyamide 6), polyhexamethylene adipamide (polyamide 66), polytetramethylene adipamide (polyamide 46), polytetramethylene sebacamide (polyamide 410), polypentamethylene adipamide (polyamide 56), polypentamethylene sebacamide (polyamide 510), polyhexamethylene sebamide (polyamide 610), polyhexamethylene dodecamide (polyamide 612), polydecamethylene adipamide (polyamide 106), polydodecamethylene adipamide (polyamide 126), polydecamethylene sebacamide (polyamide 1010), liundecanamide (polyamide 11), polydodecamide (polyamide 12), polyhexamethylene terephthalamide (polyamide 6T), polydecamethylene terephthalamide (polyamide 10T), and polycaproamide/polyhexamethylene adipamide copolymer (polyamide 6/66). These may contain another copolymerizable component as long as they do not impair the desired result. In the method, in order that polyamide fine particles to be obtained have a fine particle diameter and a narrow particle size distribution, and that the heat resistance of the polyamide constituting the obtained polyamide fine particles is increased, the crystallization temperature is preferably 150° C. or higher, and more preferably, the polyamide is selected from any one of polyamide 6, polyamide 66, and a copolymer thereof.

The range of the weight average molecular weight of a polyamide constituting polyamide fine particles is preferably 8,000 to 3,000,000. From the viewpoint of inducing phase separation with the polymer (B), the weight average molecular weight is more preferably 10,000 or more, further preferably 15,000 or more, and most preferably 20,000 or more. Since the viscosity during polymerization depends on the polymer (B), an increase in viscosity due to an increase in the molecular weight of a polyamide is suppressed. Therefore, there is an advantage that the polymerization time of a polyamide can be extended and the molecular weight can be extremely increased. However, when the polymerization time is too long, a side reaction product of polyamide such as a cross-linked product is generated, or deterioration of the polymer (B) occurs and, therefore, the weight average molecular weight of a polyamide is more preferably 2,000,000 or less, and further preferably 1,000,000 or less.

Note that the weight average molecular weight of a polyamide constituting polyamide fine particles refers to a weight average molecular weight converted from a value measured by gel permeation chromatography with using hexafluoroisopropanol as a solvent in terms of polymethyl methacrylate.

The polymer (B) refers to a polymer that dissolves in the polyamide monomer (A) at the start of polymerization but is incompatible with the polyamide after polymerization. Dissolution is determined by whether or not the polymer (B) and the monomer (A) are uniformly dissolved under conditions of temperature and pressure at which polymerization is started. The incompatibility between the polymer (B) and the polyamide is determined by whether they are a suspension or separated into two phases under temperature and pressure conditions after polymerization. Determination as to whether the solution is a homogeneous solution, suspension, or two-phase separation can be made by visually checking a reaction vessel.

More specifically, the polymer (B) is preferably non-reactive with a polyamide monomer from the viewpoint of precipitating polyamide fine particles from a uniform solution. In particular, the polymer (B) preferably does not include a polar group that reacts with a carboxyl group or an amino group that forms an amide group of polyamide, or preferably includes a polar group with low reactivity with a carboxyl group or an amino group. Examples of a polar group that reacts with a carboxyl group or an amino group include an amino group, a carboxyl group, an epoxy groups, and an isocyanate group. Examples of the polar group having low reactivity with a carboxyl group or an amino group include a hydroxyl group and a sulfhydryl group, and from the viewpoint of suppressing a cross-linking reaction, the number of polar groups in the polymer (B) is preferably 4 or less, more preferably 3 or less, and most preferably 2 or less.

The polymer (B) is preferably incompatible with polyamide but has high affinity from the viewpoint of making polyamide fine particles to be generated finer and having high solubility in the monomer (A) and narrowing the particle size distribution. In other words, regarding the affinity between monomer (A) and polymer (B) or the affinity between polymer (B) and polyamide, when solubility parameters (hereinafter, referred to as SP values) are set to $\delta_A$, $\delta_B$, and $\delta_{PA}$ ($J^{1/2}/cm^{3/2}$), respectively, the affinity between the monomer (A) and the polymer (B) can be expressed by the square of the solubility parameter difference, or $(\delta_A-\delta_B)^2$, and the affinity between the polymer (B) and the polyamide can be expressed by the square of the solubility parameter difference, or $(\delta_{PA}-\delta_B)^2$. The closer the value is to zero, the higher the affinity and the higher the solubility or compatibility, and since $\delta_A$ and $\delta_{PA}$ of the monomer (A) and the polyamide are different from each other, the polyamide is difficult to become an aggregate, and from the viewpoint of preventing the polymer (B) from being dissolved in the monomer (A) and generating an aggregate, $(\delta_A-\delta_B)^2$ preferably satisfies the range of 0.1 to 25. The lower limit of $(\delta_A-\delta_B)^2$ is more preferably 0.3 or more, further preferably 0.5 or more, and particularly preferably 1 or more. The upper limit of $(\delta_A-\delta_B)^2$ is more preferably 16 or less, further preferably 12 or less, particularly preferably 10 or less, and most preferably 7 or less. On the other hand, from the viewpoint of preventing the polymer (B) from being uniformly compatible and preventing polyamide fine particles from being unobtainable, while preventing the polyamide from becoming incompatible and becoming an aggregate, $(\delta_{PA}-\delta_B)^2$ preferably satisfies the range of 0.1 to 16. The lower limit of $(\delta_{PA}-\delta_B)^2$ is more preferably 0.3 or more, further preferably 0.5 or more, and particularly preferably 1 or more. The upper limit of $(\delta_{PA}-\delta_B)^2$ is more preferably 12 or less, further preferably 10 or less, particularly preferably 7 or less, and most preferably 4 or less.

The SP value is a value calculated from the cohesive energy density and molar molecular volume of Hoftyzer-Van Krevelen described in Properties of Polymers 4th Edition (D. W. Van Krevelen, published by *Elsevier Science* 2009), Chapter 7, p 215. When the calculation cannot be performed by this method, a value calculated from the cohesive energy density of Fedors described in the same chapter p 195 and the molar molecular volume is shown. When two or more types of monomers (A) and polymers (B) are used, a value obtained by adding the products of the respective SP values and molar fractions is shown.

Specific examples of such a polymer (B) include an alkyl ether in which polyethylene glycol, polypropylene glycol, polytetramethylene glycol, polypentamethyl ene glycol, polyhexamethylene glycol, polyethylene glycol-polypropylene glycol copolymer, or polyethylene glycol-polytetramethylene glycol copolymer and a hydroxyl group at one or both ends thereof are blocked with a methyl group, an ethyl group, a propyl group, an isopropyl group, a butyl group, a hexyl group, an octyl group, a decyl group, a dodecyl group, a hexadecyl group, or an octadecyl group, and an alkylphenyl ether in which an octylphenyl group is blocked. In particular, from the viewpoint of excellent compatibility with the polyamide monomer (A) and narrowing the particle size distribution of polyamide fine particles to be obtained, polyethylene glycol, polyethylene glycol-polypropylene glycol copolymer, polypropylene glycol, and polytetramethylene glycol, and these alkyl ethers are preferable, and from the viewpoint of excellent compatibility with water used as a solvent for ring-opening polymerization by hydrolysis of the polyamide monomer (A), polyethylene glycol and polyethylene glycol-polypropylene glycol copolymers are more preferable, and polyethylene glycol is most preferable. Two or more of these may be used at the same time as long as the desired result is not impaired.

From the viewpoint of preventing from extremely slow reaction rate of polyamide polymerization due to overhigh viscosity of a uniform solution, while the particle size and particle size distribution of polyamide fine particles to be obtained can be narrowed, the upper limit of the weight average molecular weight of a polymer (B) is preferably 500,000, more preferably 100,000 or less, and further preferably 50,000 or less. From the viewpoint of preventing formation of polyamide fine particles from being difficult due to excessive improvement in the compatibility between the polymer (B) and the polyamide, the weight average molecular weight of the polymer (B) is preferably 500 or more, more preferably 1,000 or more, and further preferably 2,000 or more.

The weight average molecular weight of the polymer (B) refers to the weight average molecular weight in terms of polyethylene glycol as measured by gel permeation chromatography using water as a solvent. When the polymer (B) does not dissolve in water, the weight average molecular weight of the polymer (B) refers to the weight average molecular weight in terms of polystyrene measured by gel permeation chromatography using tetrahydrofuran as a solvent.

Polyamide fine particles are produced by mixing these monomers (A) and polymer (B) to obtain a homogeneous solution and then polymerizing monomer (A) to initiate polymerization at a temperature higher than the crystallization temperature of a polyamide to be obtained. At this time, as the monomer (A) is converted to polyamide in a uniform mixed solution, polyamide fine particles are uniformly induced without crystallization, it is considered that polyamide fine particles with a true spherical shape, smooth surface, fineness, and narrow particle size distribution are precipitated after polymerization.

From the viewpoint of preventing formation of a large amount of aggregates because particle formation occurs from the early stage of polymerization, while the polymerization rate is moderate, and phase separation induced with polymerization occurs and particle formation occurs smoothly, the mass ratio of the monomer (A) and the polymer (B) when polymerizing is preferably 5/95 to 80/20. The lower limit of the mass ratio of monomer (A)/polymer (B) is more preferably 10/90, further preferably 20/80, and most preferably 30/70. On the other hand, the upper limit of the mass ratio of monomer (A)/polymer (B) is more preferably 70/30, further preferably 60/40, and particularly preferably 50/50.

As a method of polymerizing the monomer (A) to polyamide, a known method can be used. The method depends on the type of monomer (A), and in a lactam, anionic ring-opening polymerization using an alkali metal such as sodium or potassium or an organometallic compound such as butyl lithium or butyl magnesium as an initiator, cationic ring-opening polymerization using an acid as an initiator, hydrolytic ring-opening polymerization using water and such or the like is generally used. Cationic ring-opening polymerization and hydrolytic ring-opening polymerization are preferable because polymerization can be performed at a temperature equal to or higher than the crystallization temperature of the polyamide, which is easy to obtain true spherical and smooth polyamide fine particles, and hydrolytic ring-opening polymerization is more preferable from the viewpoint of suppressing coloring of a polyamide by an initiator and gelation or a decomposition reaction due to a crosslinking reaction in polymerization at a temperature higher than the crystallization temperature of the polyamide to be obtained. A method of ring-opening polymerization of a lactam by hydrolysis is not limited as long as the method is a known method, and a method in which pressure is applied in the presence of water to generate an amino acid while promoting lactam hydrolysis, and then ring-opening polymerization and polycondensation reaction are performed while removing water is preferred.

In this example, since a polycondensation reaction does not occur if water is present, polymerization starts at the same time as the water is discharged out of the reaction vessel. Accordingly, the amount of water used is not particularly limited as long as hydrolysis of a lactam proceeds, and usually, when the total amount of the monomer (A) and the polymer (B) is 100 parts by mass, the amount of water used is preferably 100 parts by mass or less. To improve the production efficiency of polyamide fine particles, the amount of water used is more preferably 70 parts by mass or less, further preferably 50 parts by mass or less, and particularly preferably 30 parts by mass or less. To prevent a hydrolysis reaction of a lactam from proceeding, the lower limit of the amount of water used is preferably 1 part by mass or more, more preferably 2 parts by mass or more, further preferably 5 parts by mass or more, and particularly preferably 10 parts by mass or more. As a method of removing water (condensation water) generated by condensation during polycondensation, a known method such as a method of removing water while flowing an inert gas such as nitrogen at normal pressure or a method of removing water under reduced pressure can be used as appropriate.

When the monomer (A) is an amino acid, dicarboxylic acid and diamine, or a salt thereof, a polycondensation reaction can be used as a polymerization method. On the other hand, in these monomers (A), there is a combination in which dissolution with the polymer (B) does not occur uniformly. Regarding such monomer (A) and polymer (B), it is possible to produce polyamide fine particles by further adding a solvent (C) of the monomer (A) and the polymer (B).

The solvent (C) is not particularly limited as long as it is in the above range, and water is most preferable because it is the same as condensed water that needs to be discharged out of a system to dissolve the monomer (A) and the polymer (B) and to proceed a polycondensation reaction.

In particular, when using an amino acid such as aminohexanoic acid or aminododecanoic acid for the monomer (A), or when using a dicarboxylic acid and a diamine such as adipic acid and hexamethylenediamine for the monomer (A), by adding polyethylene glycol, polyethylene glycol-polypropylene glycol copolymers, and an alkyl ether thereof as the polymer (B) and water as the solvent (C), a uniform solution is formed at the temperature at which polymerization starts. After that, by discharging condensed water generated by progress of polycondensation with water as the solvent (C) out of a reaction vessel, polyamide fine particles can be produced while polymerization proceeds. In this example, when the total amount of amino acid or dicarboxylic acid, diamine, and the polymer (B) is set to 100 parts by mass, the amount of water used as the solvent (C) is preferably 10 to 200 parts by mass. From the viewpoint of preventing the particle diameter from becoming coarse, the amount of water used is more preferably 150 parts by mass or less, and further preferably 120 parts by mass or less. On the other hand, from the viewpoint of ensuring that water functions as a solvent, the amount of water used is preferably 20 parts by mass or more, and further preferably 40 parts by mass or more.

Two or more lactams and amino acids and/or dicarboxylic acids or diamines may be used in mixture, and in this example, water functions for hydrolysis or as a solvent (C).

The polymerization temperature is not particularly limited as long as the polymerization of polyamide proceeds, and from the viewpoint of controlling a polyamide having a high crystallization temperature closer to a true sphere and having a smooth surface, the polymerization temperature is preferably set to a temperature equal to or higher than the crystallization temperature of polyamide to be obtained. The polymerization temperature is more preferably the crystallization temperature of a polyamide to be obtained +15° C. or higher, further preferably the crystallization temperature of a polyamide to be obtained +30° C. or higher, and particularly preferably the crystallization temperature of a polyamide to be obtained +45° C. or higher. From the viewpoint of preventing a side reaction of a polyamide such as a three-dimensional cross-linked product and progression of coloring or deterioration of the polymer (B), the polymerization temperature is preferably the melting point of a polyamide to be obtained +100° C. or less, more preferably the melting point of a polyamide to be obtained +50° C. or less, further preferably the melting point of a polyamide to be obtained +20° C. or less, particularly preferably the melting point of a polyamide to be obtained, and most preferably the melting point of a polyamide to be obtained −10° C. or lower.

The crystallization temperature of a polyamide constituting polyamide fine particles refers to the apex of an exothermic peak which appears when the temperature is raised from 30° C. to the temperature 30° C. higher than the endothermic peak indicating the melting point of the polyamide at a rate of 20° C./min using a DSC method, thereafter holding for 1 minute, and then cooled to 30° C. at a rate of 20° C./min. The peak of an endothermic peak when the temperature is further raised at a rate of 20° C./min after cooling is set to the melting point of polyamide fine particles.

The polymerization time can be appropriately adjusted according to the molecular weight of polyamide fine particles to be obtained, and from the viewpoint of preventing progression of a side reaction and coloring of the polyamide such as a three-dimensional cross-linked product and deterioration of the polymer (B) while ensuring that polymerization proceeds to obtain polyamide fine particles, the polymerization time is usually preferably 0.1 to 70 hours. The lower limit of the polymerization time is more preferably 0.2 hours or more, further preferably 0.3 hours or more, and particularly preferably 0.5 hours or more. The upper limit of the polymerization time is more preferably 50 hours or less, further preferably 25 hours or less, and particularly preferably 10 hours or less.

A polymerization accelerator may be added as long as the desired effect is not impaired. As the accelerator, a known one can be used, and examples thereof include an inorganic phosphorus compound such as phosphoric acid, phosphorous acid, hypophosphorous acid, pyrophosphoric acid, polyphosphoric acid, and an alkali metal salt and an alkaline earth metal salt thereof. Two or more of these may be used. The amount of each addition can be appropriately selected, and it is preferable to add 1 part by mass or less with respect to 100 parts by mass of the monomer (A).

Another additive may be added, and examples thereof include a surfactant to control the particle size of polyamide fine particles, a dispersant, and an antioxidant, a heat stabilizer, a weathering agent, a lubricant, a pigment, a dye, a plasticizer, an antistatic agent, and a flame retardant to improve the properties of polyamide fine particles and improve the stability of the polymer (B) to be used. Two or more of these may be used. Two or more different types may be used for the purpose of modifying the monomer (A) or polyamide and for the purpose of modifying the polymer (B). The amount of each addition can be appropriately selected, and it is preferable to add 1 part by mass or less with respect to 100 parts by mass in total of the monomer (A) and the polymer (B).

Since polyamide fine particles are homogeneously induced from a homogeneous solution, tiny fine particles can be produced without performing stirring, but stirring may be performed to further control the particle size and make the particle size distribution more uniform. As a stirring device, a known device such as a stirring blade, a melt kneader, or a homogenizer can be used, and in a stirring blade, examples thereof include a propeller-, paddle-, flat-, turbine-, cone-, anchor-, screw-, and helical-type. The stirring speed depends on the type and molecular weight of the polymer (B), the stirring speed is preferably 0 to 2,000 rpm from the viewpoint of uniformly transferring heat even in a large apparatus and preventing a liquid from adhering to the wall surface to change the blending ratio. The lower limit of the stirring speed is more preferably 10 rpm or more, further preferably 30 rpm or more, particularly preferably 50 rpm or more, and the upper limit of the stirring speed is more preferably 1,600 rpm or less, further preferably 1,200 rpm or less, and particularly preferably 800 rpm or less.

Examples of the method of isolating polyamide fine particles from a mixture of the polyamide fine particles and the polymer (B) after completion of polymerization include a method of isolating after discharging a mixture at the completion of polymerization into a poor solvent for polyamide fine particles and a method of isolating after adding a poor solvent for polyamide fine particles in a reaction vessel. From the viewpoint of preventing polyamide fine particles from melting and coalescing to broaden the particle size distribution, a method of isolating by discharging a mixture into a poor solvent for polyamide fine particles after cooling to the melting point of the polyamide fine particles or lower, more preferably the crystallization temperature or lower or a method of isolating by adding a poor solvent for polyamide fine particles to a reaction vessel is preferable, and a method of isolating by adding a poor solvent for polyamide fine particles to a reaction vessel is more preferable. As the isolation method, a known method such as reduced pressure, pressure filtration, decantation, centrifugation, spray drying or the like can be appropriately selected.

The poor solvent for polyamide fine particles is preferably a solvent that does not dissolve a polyamide but further dissolves the monomer (A) or the polymer (B). Such a solvent can be appropriately selected, and an alcohol such as methanol, ethanol or isopropanol, or water is preferred.

Washing, isolation, and drying of polyamide fine particles can be carried out by a known method. As the washing method of removing a deposit and inclusion on polyamide fine particles, reslurry cleaning or the like can be used, and heating may be performed as appropriate. The solvent used for washing is not limited as long as it does not dissolve polyamide fine particles and dissolves the monomer (A) or the polymer (B), and methanol, ethanol, isopropanol, or water is preferable from the viewpoint of economy, and water is most preferable. The isolation method can be appropriately selected from reduced pressure, pressure filtration, decantation, centrifugation, spray drying and the like. Drying is preferably carried out at the melting point of polyamide fine particles or lower, and may be carried out under reduced pressure. Air drying, hot air drying, heat drying, reduced pressure drying, freeze drying or the like is selected.

Polyamide fine particles are produced by the above method. It is thus possible to produce polyamide fine particles having a high crystallization temperature, which has hitherto been difficult, with a uniform particle diameter, a true spherical shape, and a smooth surface.

The high crystallization temperature polyamide constituting polyamide fine particles refers to a crystalline polyamide having a crystallization temperature of 150° C. or higher. From the viewpoint of increasing the melting point, chemical resistance or the like due to crystallinity and obtaining a polyamide with higher heat resistance, the crystallization temperature of a polyamide is preferably 160° C. or higher, more preferably 170° C. or higher, and further preferably 180° C. or higher. From the viewpoint of preventing the shape from becoming porous, the crystallization temperature of the polyamide is preferably 300° C. or less, more preferably 280° C. or less, and particularly preferably 260° C. or less.

Specific examples of the high crystallization temperature polyamide include polycaproamide (polyamide 6), polyhexamethylene adipamide (polyamide 66), polytetramethylene adipamide (polyamide 46), polytetramethylene sebacamide (polyamide 410), polypentamethylene adipamide (polyamide 56), polypentamethylene sebacamide (polyamide 510), polyhexamethylene sebacamide (polyamide 610), polyhexamethylene dodecamide (polyamide 612), polydecamethylene adipamide (polyamide 106), polydodecamethylene adipamide (polyamide 126), polyhexamethylene terephthalamide (polyamide 6T), polydecamethylene terephthalamide (polyamide 10T), and polycaproamide/polyhexamethylene adipamide copolymer (polyamide 6/66), and preferred is polycaproamide (polyamide 6), polyhexamethylene adipamide (polyamide 66), polyhexamethylene sebacamide (polyamide 610), polyhexamethylene dodecamide (polyamide 612), polydecamethylene adipamide (polyamide 106), polydodecamethylene adipamide (polyamide 126), or polycaproamide/polyhexamethylene adipamide copolymer (polyamide 6/66), and more preferred is polycaproamide (polyamide 6), polyhexamethylene adipamide (polyamide 66), or polycaproamide/polyhexamethylene adipamide copolymer (polyamide 6/66).

The number average particle size of the polyamide fine particles is 0.1 to 100 µm. When the number average particle size exceeds 100 µm, the surface of a coating film prepared from the particles becomes inhomogeneous. The number average particle size of polyamide fine particles is preferably 80 µm or less, more preferably 60 µm or less, further preferably 50 µm or less, and particularly preferably 30 µm or less. When the number average particle size is less than 0.1 µm, aggregation of particles occurs. The number average particle size of polyamide fine particles is preferably 0.3 µm or more, more preferably 0.7 µm or more, further preferably 1 µm or more, particularly preferably 2 µm or more, and most preferably 3 µm or more.

The particle size distribution index indicating the particle size distribution of the polyamide fine particles is 3.0 or less. When the particle size distribution index exceeds 3.0, the fluidity is inferior in paint or cosmetic applications, and the uniformity of a coating film surface is impaired. The particle size distribution index is preferably 2.0 or less, more preferably 1.5 or less, further preferably 1.3 or less, and most preferably 1.2 or less. The lower limit is theoretically 1.

The number average particle size of polyamide fine particles can be calculated by specifying 100 particle diameters randomly from a scanning electron micrograph and calculating the arithmetic average thereof. In the above micrograph, when the shape is not a perfect circle, or the shape is oval for example, the maximum diameter of the particle is taken as the particle diameter. To accurately measure the particle size, measurement is carried out at a magnification of at least 1,000 times, and preferably at least 5,000 times. The particle size distribution index is determined based on the following numerical conversion formula for the particle size value obtained above.

$$D_n = \left(\sum_{i=1}^{n} D_i\right)/n \quad D_v = \sum_{i=1}^{n} D_i^4 / \sum_{i=1}^{n} D_i^3 \quad PDI = D_v/D_n$$

Di: particle diameter of each particle, n: number of measurements 100, Dn: number average particle size, Dv: volume average particle size, and PDI: particle size distribution index.

Since the polyamide fine particles have a smooth shape in addition to a true spherical shape, it is possible to impart favorable slipperiness and fluidity to cosmetics and paints.

The sphericity indicating the sphericity of polyamide fine particles is 90 or more. When the sphericity is less than 90, it is not possible to impart a smoother feel in cosmetics and paint applications. The sphericity is preferably 95 or more, more preferably 97 or more, and further preferably 98 or more. The upper limit thereof is 100.

The sphericity of polyamide fine particles is determined by observing 30 particles randomly from a scanning electron micrograph and determining a short diameter and a long diameter according to the following formula.

$$S = \sum_{i=1}^{n} (b/a)/n$$

S: sphericity, a: major axis, b: minor axis, and n: number of measurements is 30.

The smoothness of the surface of polyamide fine particles can be expressed by the amount of linseed oil absorbed by the polyamide fine particles. In other words, the smoother the surface, the smaller the number of pores on the surface is, and the smaller the linseed oil absorption indicating the amount of linseed oil absorbed is. The linseed oil absorption of the polyamide fine particles is 100 mL/100 g or less. When the linseed oil absorption of polyamide fine particles exceeds 100 mL/100 g, favorable fluidity cannot be imparted to cosmetics and paints. The linseed oil absorption of polyamide fine particles is preferably 90 mL/100 g or less, more preferably 80 mL/100 g or less, further preferably 70 mL/100 g or less, and particularly preferably 60 mL/100 g or less. The lower limit of the linseed oil absorption is 0 mL/100 g or more.

The linseed oil absorption is measured in accordance with Japanese Industrial Standard (JIS Standard) JIS K 5101 "Pigment Test Method, Refined Linseed Oil Method".

The smoothness of the surface can also be expressed by the BET specific surface area by gas adsorption, and the smoother the surface, the smaller the BET specific surface area. Specifically, the BET specific surface area is preferably 10 m$^2$/g or less, more preferably 5 m$^2$/g or less, further preferably 3 m$^2$/g or less, particularly preferably 1 m$^2$/g or less, and most preferably 0.5 m$^2$/g or less.

The BET specific surface area is measured in accordance with Japanese Industrial Standard (JIS standard) JIS R 1626 (1996) "Method for measuring specific surface area by gas adsorption BET method".

EXAMPLES

Hereinafter, my methods and fine particles will be described by way of Examples, but this disclosure is not limited thereto.

(1) Average Particle Size and Particle Size Distribution Index

The number average particle size of polyamide fine particles was calculated by specifying 100 particle diameters randomly from a scanning electron micrograph and calculating the arithmetic average thereof. In the above micrograph, when the shape was not a perfect circle or the shape was oval, for example, the maximum diameter of the particle was taken as the particle diameter. The particle size distribution index was calculated based on the following numerical conversion formula for the particle size value obtained above.

$$D_n = \left(\sum_{i=1}^{n} D_i\right)/n \quad D_v = \sum_{i=1}^{n} D_i^4 / \sum_{i=1}^{n} D_i^3 \quad PDI = D_v/D_n$$

Di: particle diameter of each particle, n: number of measurements 100, Dn: number average particle size, Dv: volume average particle size, and PDI: particle size distribution index.

(2) Sphericity

The sphericity of polyamide fine particles was calculated by observing 30 particles randomly from a scanning electron micrograph and determining a short diameter and a long diameter according to the following formula.

$$S = \sum_{i=1}^{n} (b/a)/n$$

S: sphericity, a: major axis, b: minor axis, and n: number of measurements is 30.

(3) Linseed Oil Absorption

In accordance with Japanese Industrial Standard (JIS Standard) JIS K 5101 "Pigment Test Method Refined Linseed Oil Method", about 100 mg of polyamide fine particles were precisely weighed on a watch glass, refined linseed oil (manufactured by KANTO CHEMICAL CO., INC.) was gradually added with a burette drop by drop, kneaded with a palette knife, then dripping-kneading was repeated until a sample lump was formed, the oil absorption (mL/100 g) was calculated from the amount of refined linseed oil used for dropping, with the point at which the paste had smooth hardness as the completion point.

(4) BET Specific Surface Area

In accordance with Japanese Industrial Standard (JIS Standard) JIS R 1626 (1996) "Method for Measuring Specific Surface Area by Gas Adsorption BET Method", using BELSORP-max manufactured by BEL JAPAN INC., about 0.2 g of polyamide fine particles were put into a glass cell and degassed under reduced pressure at 80° C. for about 5 hours, then a krypton gas adsorption isotherm at liquid nitrogen temperature was measured, and the BET specific surface area was calculated by the BET method.

(5) Crystallization Temperature and Melting Point of Polyamide Constituting Polyamide Fine Particles The apex of an exothermic peak which appears when the temperature is raised from 30° C. to the temperature 30° C. higher than the endothermic peak indicating the melting point of the polyamide at a rate of 20° C./min using a differential scanning calorimeter (DSCQ20) manufactured by TA Instruments Japan Inc., thereafter holding for 1 minute, and then cooled to 30° C. at a rate of 20° C./min was defined as the crystallization temperature. The peak of an endothermic peak when the temperature is further raised at a rate of 20° C./min after cooling was set to the melting point. The amount of polyamide fine particles required for measurement was about 8 mg.

(6) Molecular Weight of Polyamide Constituting Polyamide Fine Particles

The weight average molecular weight of polyamide was calculated by using a gel permeation chromatography method and comparison with a calibration curve of polymethyl methacrylate. A measurement sample was prepared by dissolving about 3 mg of polyamide fine particles in about 3 g of hexafluoroisopropanol.

Apparatus: WATERS E-ALLIANCE GPC SYSTEM
Column: Manufactured by Showa Denko K.K., HFIP-806M×2
Mobile phase: 5 mmol/L Sodium trifluoroacetate/hexafluoroisopropanol
Flow velocity: 1.0 mL/min.
Temperature: 30° C.
Detection: Differential refractometer.

(7) Molecular Weight of Polymer (B)

The weight average molecular weight of the polymer (B) was calculated by using a gel permeation chromatography method and comparison with a calibration curve using polyethylene glycol. A measurement sample was prepared by dissolving about 3 mg of the polymer (B) in about 6 g of water.

Apparatus: Manufactured by Shimadzu Corporation, LC-10A series
Column: Manufactured by Tosoh Corporation, TSKgelG3000PWXL
Mobile phase: 100 mmol/L Sodium chloride aqueous solution
Flow velocity: 0.8 mL/min.
Temperature: 40° C.
Detection: Differential refractometer.

Example 1

4 g of ε-caprolactam (special grade manufactured by Wako Pure Chemical Industries, Ltd., SP value 19.5), 6 g of polyethylene glycol (first grade polyethylene glycol 6,000, molecular weight 7,700, SP value 21.3, manufactured by Wako Pure Chemical Industries, Ltd.), and 10 g of water for hydrolysis were added to a 100 mL autoclave, and after sealing the autoclave, replacement with nitrogen was performed up to 10 kg/cm². The system pressure was adjusted to 0.1 kg/cm² while releasing nitrogen, and then the temperature was raised to 240° C. At this time, after the system pressure reached 10 kg/cm², water vapor was controlled to be slightly released so that the pressure was maintained at 10 kg/cm². After the temperature reached 240° C., polymerization was started by releasing the pressure at a rate of 0.2 kg/cm²·min. At this point, the inner solution was uniformly transparent. While raising the temperature to 255° C., the pressure in the system was reduced to 0 kg/cm², and at the same time, heating was maintained while flowing nitrogen for 3 hours to complete the polymerization. After polymerization, the inner solution was suspended. Nitrogen was again filled to 10 kg/cm² and then cooled to room temperature. Water was added to the obtained solid and heated to 80° C. to dissolve the dissolved matter. The obtained slurry was filtered, and 40 g of water was added to the filtered product, followed by washing at 80° C. A slurry liquid without an aggregate filtered through a 200 μm sieve was then filtered again and the filtered product isolated was dried at 80° C. for 12 hours to obtain 2.8 g of powder. There were no aggregates greater than 200 µm. The obtained powder had a melting point of 214° C. similar to that of polyamide 6, a crystallization temperature of 172° C., and a molecular weight of 38,000. From scanning electron microscope observation, polyamide 6 powder had a true spherical fine particle shape, a number average particle size of 6.6 µm, a particle size distribution index of 1.08, a sphericity of 96, a linseed oil absorption of 57 mL/100 g, and a BET specific surface area of 1.0 $m^2/g$. The SP value of polyamide 6 is 21.9. FIG. 1 shows a scanning electron micrograph (magnification ×3,000) of the true spherical polyamide 6 fine particles. Table 1 shows the properties of the obtained polyamide 6 fine particles.

melting point of 213° C. similar to that of polyamide 6, a crystallization temperature of 172° C., and a molecular weight of 26,800. From scanning electron microscope observation, polyamide 6 powder had a true spherical shape and a fine particle shape with a smooth surface, a number average particle size of 5.3 µm, a particle size distribution index of 1.24, a sphericity of 95, and a linseed oil absorption of 59 mL/100 g. Table 1 shows the properties of the obtained polyamide 6 fine particles.

Example 4

Polymerization was carried out in the same manner as in Example 1 except that a polyethylene glycol (Wako Pure

TABLE 1

| | | Example 1 | Example 2 | Example 3 | Example 4 | Example 5 | Example 6 | Example 7 | Example 8 |
|---|---|---|---|---|---|---|---|---|---|
| Polyamide constituting polyamide fine particles | | poly-amide 6 | poly-amide 6 | poly-amide 6 | poly-amide 6 | poly-amide 6 | poly-amide 6 | poly-amide 6 | poly-amide 6 |
| Weight average molecular weight of polyamide constituting polyamide fine particles | | 38,000 | 44,100 | 26,800 | 35,600 | 32,500 | 41,700 | 38,000 | 40,200 |
| Number average particle size of polyamide fine particles | (µm) | 6.6 | 12.9 | 5.3 | 6.1 | 3.5 | 6.1 | 21.5 | 31.5 |
| Sphericity of polyamide fine particles | | 96 | 95 | 95 | 92 | 93 | 93 | 91 | 90 |
| Particle size distribution index of polyamide fine particles | | 1.08 | 1.76 | 1.24 | 1.23 | 1.15 | 1.34 | 1.92 | 2.76 |
| Linseed oil adsorption amount of polyamide fine particles | (mL/100 g) | 57 | 54 | 59 | 60 | 59 | 53 | 65 | 63 |
| Melting point of polyamide fine particles | (° C.) | 214 | 216 | 213 | 211 | 210 | 212 | 216 | 214 |
| Crystallization temperature of polyamide fine particles | (° C.) | 172 | 169 | 172 | 170 | 175 | 171 | 170 | 169 |

Example 2

Figure 2:
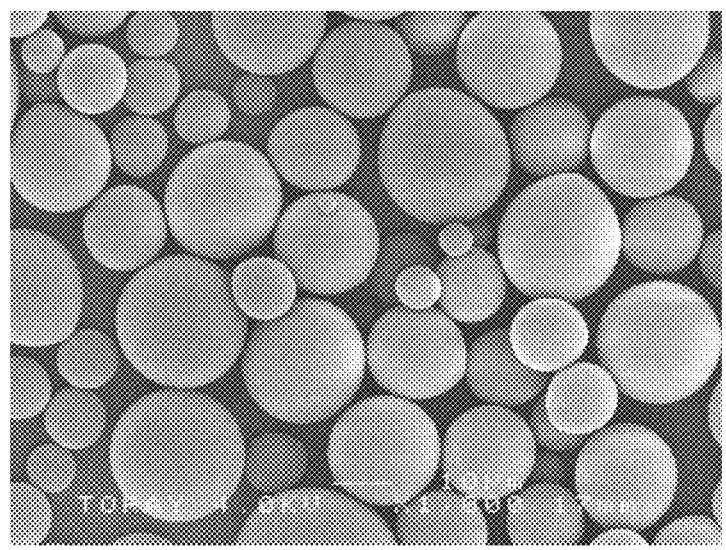
FIG. 2 is a scanning electron micrograph of polyamide fine particles obtained in Example 2.

Polymerization was carried out in the same manner as in Example 1 except that ε-caprolactam was changed to 5 g and polyethylene glycol (first grade polyethylene glycol 6,000 manufactured by Wako Pure Chemical Industries, Ltd.) was changed to 5 g to obtain 0.7 g of powder. The solution was a homogeneous solution at the start of polymerization, and a suspension after polymerization. The obtained powder had a melting point of 216° C. similar to that of polyamide 6, a crystallization temperature of 169° C., and a molecular weight of 44,100. From scanning electron microscope observation, polyamide 6 powder had a true spherical shape and a fine particle shape with a smooth surface, a number average particle size of 12.9 µm, a particle size distribution index of 1.76, a sphericity of 95, and a linseed oil absorption of 54 mL/100 g. FIG. 2 shows a scanning electron micrograph (magnification ×1,000) of the true spherical polyamide 6 fine particles. Table 1 shows the properties of the obtained polyamide 6 fine particles.

Example 3

Polymerization was carried out in the same manner as in Example 1 except that ε-caprolactam was changed to 2 g and polyethylene glycol (first grade polyethylene glycol 6,000 manufactured by Wako Pure Chemical Industries, Ltd.) was changed to 8 g to obtain 1.5 g of powder. The solution was a homogeneous solution at the start of polymerization and a suspension after polymerization. The obtained powder had a Chemical Industries, Ltd., first grade polyethylene glycol 20,000, molecular weight 18,600, SP value 21.3) having a different molecular weight was used to obtain 3.3 g of a powder. The solution was a homogeneous solution after the polymerization, and was a suspension solution at the end of the polymerization. The obtained powder had a melting point of 211° C. similar to that of polyamide 6, a crystallization temperature of 170° C., and a molecular weight of 35,600. From scanning electron microscope observation, polyamide 6 powder had a true spherical shape and a fine particle shape with a smooth surface, a number average particle size of 6.1 µm, a particle size distribution index of 1.23, a sphericity of 92, and a linseed oil absorption of 60 mL/100 g. Table 1 shows the properties of the obtained polyamide 6 fine particles.

Example 5

Polymerization was carried out in the same manner as in Example 1 except that a polyethylene glycol (Wako Pure Chemical Industries, Ltd., first grade polyethylene glycol 35,000, molecular weight 31,000, SP value 21.3) having a different molecular weight was used to obtain 2.1 g of a powder. The solution was a homogeneous solution at the start of polymerization and a suspension after polymerization. The obtained powder had a melting point of 210° C. similar to that of polyamide 6, a crystallization temperature of 175° C., and a molecular weight of 32,500. From scanning electron microscope observation, polyamide 6 powder had a true spherical shape and a fine particle shape with a smooth surface, a number average particle size of 3.5 μm, a particle size distribution index of 1.15, a sphericity of 93, and a linseed oil absorption of 59 mL/100 g. Table 1 shows the properties of the obtained polyamide 6 fine particles.

Example 6

Polymerization was carried out in the same manner as in Example 1 except that a polyethylene glycol (Wako Pure Chemical Industries, Ltd., first grade polyethylene glycol 2,000, molecular weight 2,300, SP value 21.3) having a different molecular weight was used to obtain 2.3 g of a powder. The solution was a homogeneous solution at the start of polymerization and a suspension after polymerization. The obtained powder had a melting point of 212° C. similar to that of polyamide 6, a crystallization temperature of 171° C., and a molecular weight of 41,700. From scanning electron microscope observation, polyamide 6 powder had a true spherical shape and a fine particle shape with a smooth surface, a number average particle size of 6.1 μm, a particle size distribution index of 1.34, a sphericity of 93, and a linseed oil absorption of 53 mL/100 g. Table 1 shows the properties of the obtained polyamide 6 fine particles.

Example 7

Polymerization was carried out in the same manner as in Example 1 except that the polyethylene glycol was changed to a polyethylene glycol (Wako Pure Chemical Industries, Ltd., first grade polypropylene glycol 2,000, molecular weight 3,600, SP value 18.7) to obtain 2.3 g of a powder. The solution was a homogeneous solution at the start of polymerization and a suspension after polymerization. The obtained powder had a melting point of 216° C. similar to that of polyamide 6, a crystallization temperature of 170° C., and a molecular weight of 38,000. From scanning electron microscope observation, polyamide 6 powder had a true spherical shape and a fine particle shape with a smooth surface, a number average particle size of 21.5 μm, a particle size distribution index of 1.92, a sphericity of 91, and a linseed oil absorption of 65 mL/100 g. Table 1 shows the properties of the obtained polyamide 6 fine particles.

Example 8

Polymerization was carried out in the same manner as in Example 1 except that the polytetramethylene glycol was changed to a polyethylene glycol (Wako Pure Chemical Industries, Ltd., first grade polytetramethylene glycol 2,000, molecular weight 7,500, SP value 17.9) to obtain 2.3 g of a powder. The solution was a homogeneous solution at the start of polymerization and a suspension after polymerization. The obtained powder had a melting point of 214° C. similar to that of polyamide 6, a crystallization temperature of 169° C., and a molecular weight of 40,200. From scanning electron microscope observation, polyamide 6 powder had a true spherical shape and a fine particle shape with a smooth surface, a number average particle size of 31.5 μm, a particle size distribution index of 2.76, a sphericity of 90, and a linseed oil absorption of 63 mL/100 g. Table 1 shows the properties of the obtained polyamide 6 fine particles.

Example 9

Figure 3:
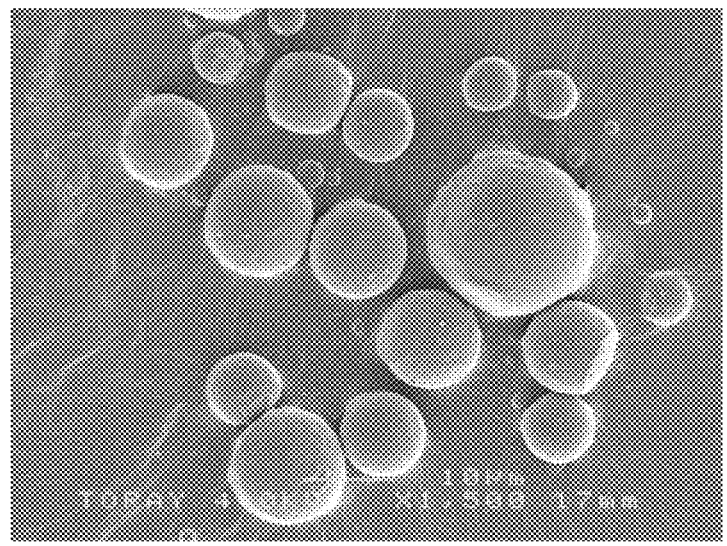
FIG. 3 is a scanning electron micrograph of polyamide fine particles obtained in Example 8.

1.7 g of adipic acid (manufactured by Tokyo Chemical Industry Co., Ltd., SP value 25.4), 2.2 g of a 50% aqueous solution of hexamethylenediamine (manufactured by Tokyo Chemical Industry Co., Ltd., SP value 19.2), 6 g of polyethylene glycol (first grade polyethylene glycol 20,000, molecular weight 18,600, manufactured by Wako Pure Chemical Industries, Ltd.), and 2.6 g water as a solvent were added to a 100 mL autoclave, and after sealing the autoclave, replacement with nitrogen was performed up to 10 kg/cm$^2$. The system pressure was adjusted to 0.1 kg/cm$^2$ while releasing nitrogen, and then the temperature was raised to 260° C. At this time, after the system pressure reached 17.5 kg/cm$^2$, the pressure was controlled while slightly releasing the pressure to maintain 17.5 kg/cm$^2$. After the temperature reached 260° C., polymerization was started by releasing the pressure at a rate of 0.6 kg/cm$^2$·min. At this point, the inner solution was uniformly transparent. While raising the temperature to 280° C., the pressure in the system was reduced to 0, and at the same time, heating was maintained while flowing nitrogen for 1 hour to complete polymerization. After polymerization, the inner solution was suspended. The obtained slurry was filtered, and 40 g of water was added to the filtered product, followed by washing at 80° C. A slurry liquid without an aggregate filtered through a 200 μm sieve was then filtered again and the filtered product isolated was dried at 80° C. for 12 hours to obtain 2.3 g of powder. There were no aggregates greater than 200 μm. The obtained powder had a melting point of 267° C. similar to that of polyamide 66, a crystallization temperature of 211° C., and a molecular weight of 73,600. From scanning electron microscope observation, polyamide 66 powder had a true spherical shape and a fine particle shape with a smooth surface, a number average particle size of 6.5 μm, a particle size distribution index of 1.60, a sphericity of 91, and a linseed oil absorption of 56 mL/100 g. FIG. 3 shows a scanning electron micrograph (magnification ×1,500) of the true spherical polyamide 66 fine particles. The SP value of polyamide 66 is 20.6. Table 2 shows the properties of the obtained polyamide 66 fine particles.

TABLE 2

|  |  | Example 9 | Example 10 | Example 11 | Example 12 | Comparative Example 1 | Comparative Example 2 | Comparative Example 3 | Comparative Example 4 | Comparative Example 5 |
|---|---|---|---|---|---|---|---|---|---|---|
| Polyamide constituting polyamide fine particles |  | polyamide 66 | polyamide 6 | polyamide 12 | polyamide 12 | — | — | polyamide 6 | — | — |
| Weight average molecular weight of polyamide constituting polyamide fine particles |  | 73,600 | 21,000 | 110,000 | 50,000 | — | — | 34,400 | — | — |
| Number average particle size of polyamide fine | (μm) | 6.5 | 13.1 | 6.6 | 6.0 | — | — | 18.0 | — | — |

TABLE 2-continued

|  |  | Example 9 | Example 10 | Example 11 | Example 12 | Comparative Example 1 | Comparative Example 2 | Comparative Example 3 | Comparative Example 4 | Comparative Example 5 |
|---|---|---|---|---|---|---|---|---|---|---|
| particles |  |  |  |  |  |  |  |  |  |  |
| Sphericity of polyamide fine particles |  | 91 | 92 | 94 | 96 | — | — | 68 | — | — |
| Particle size distribution index of polyamide fine particles |  | 1.60 | 1.54 | 1.37 | 1.30 | — | — | 1.30 | — | — |
| Linseed oil adsorption amount of polyamide fine particles | (mL/ 100 g) | 56 | 60 | 54 | 58 | — | — | — | — | — |
| Melting point of polyamide fine particles | (° C.) | 267 | 216 | 173 | 175 | — | — | 210 | — | — |
| Crystallization temperature of polyamide fine particles | (° C.) | 211 | 170 | 139 | 136 | — | — | 165 | — | — |

Example 10

4 g of aminohexanoic acid (manufactured by Wako Pure Chemical Industries, Ltd., SP value 17.5), 6 g of polyethylene glycol (first grade polyethylene glycol 6,000, manufactured by Wako Pure Chemical Industries, Ltd.), and 10 g of water as a solvent were added to a 100 mL autoclave, and after forming a homogeneous solution, the autoclave was sealed, and replacement with nitrogen was performed up to 10 kg/cm$^2$. The system pressure was adjusted to 0.1 kg/cm$^2$ while releasing nitrogen, and then the temperature was raised to 240° C. At this time, after the system pressure reached 10 kg/cm$^2$, water vapor was controlled to be slightly released so that the pressure was maintained at 10 kg/cm$^2$. After the temperature reached 240° C., polymerization was started by releasing the pressure at a rate of 0.2 kg/cm$^2$·min. While raising the temperature to 255° C., the pressure in the system was reduced to 0, and at the same time, heating was maintained while flowing nitrogen for 3 hours to complete the polymerization. After polymerization, the inner solution was suspended. Nitrogen was again filled to 10 kg/cm$^2$ and then cooled to room temperature. Water was added to the obtained solid and heated to 80° C. to dissolve the dissolved matter. The obtained slurry was filtered, and 40 g of water was added to the filtered product, followed by washing at 80° C. A slurry liquid without an aggregate filtered through a 200 m sieve was then filtered again and the filtered product isolated was dried at 80° C. for 12 hours to obtain 1.4 g of powder. There were no aggregates greater than 200 μm. The obtained powder had a melting point of 216° C. similar to that of polyamide 6, a crystallization temperature of 170° C., and a molecular weight of 21,000. From scanning electron microscope observation, polyamide 6 powder had a true spherical fine particle shape, a number average particle size of 13.1 μm, a particle size distribution index of 1.54, a sphericity of 92, and a linseed oil absorption of 60 mL/100 g. Table 2 shows the properties of the obtained polyamide 6 fine particles.

Example 11

Figure 4:
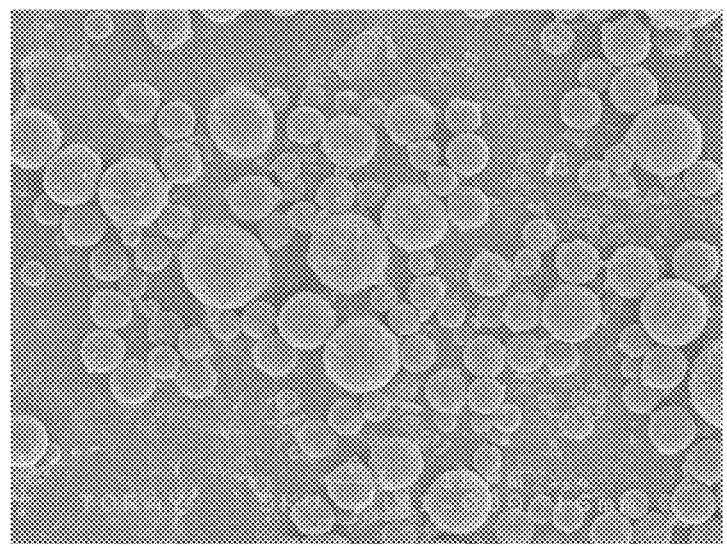
FIG. 4 is a scanning electron micrograph of polyamide fine particles obtained in Example 10.

Polymerization was carried out in the same manner as in Example 10 except that aminohexanoic acid was changed to aminododecanoic acid (manufactured by Wako Pure Chemical Industries, Ltd., SP value 17.2) and that a polyethylene glycol with a different molecular weight (first grade polyethylene glycol 20,000 manufactured by Wako Pure Chemical Industries, Ltd.) was used, to obtain 0.8 g of powder. A homogeneous solution was formed from the time when the temperature was raised to 100° C. or higher, and the solution was a suspension after polymerization. The obtained powder had a melting point of 173° C. similar to that of polyamide 12, a crystallization temperature of 139° C., and a molecular weight of 110, 00. From scanning electron microscope observation, polyamide 12 powder had a true spherical shape and a fine particle shape with a smooth surface, a number average particle size of 6.6 μm, a particle size distribution index of 1.37, a sphericity of 94, and a linseed oil absorption of 54 mL/100 g. FIG. 4 shows a scanning electron micrograph (magnification ×1,000) of the true spherical polyamide 12 fine particles. Table 2 shows the properties of the obtained polyamide 12 fine particles.

Example 12

Polymerization was carried out in the same manner as in Example 11 except that 2 g of the aminododecanoic acid and 8 g of the polyethylene glycol were used, to obtain 1.2 g of powder. The obtained powder had a melting point of 175° C. similar to that of polyamide 12, a crystallization temperature of 136° C., and a molecular weight of 50,000. From scanning electron microscope observation, polyamide 12 powder had a true spherical shape and a fine particle shape with a smooth surface, a number average particle size of 6.0 μm, a particle size distribution index of 1.30, a sphericity of 96, and a linseed oil absorption of 58 mL/100 g. Table 2 shows the properties of the obtained polyamide 12 fine particles.

Comparative Example 1

Polymerization was carried out in the same manner as in Example 1 except that the polyethylene glycol was changed to dimethyl silicone oil (manufactured by Shin-Etsu Chemical Co., Ltd. KF-96H, 10,000 cs, molecular weight 88,400, SP value 14.5) and the water used for washing was changed to toluene. The liquid was separated into two phases at the start of polymerization, and remained coarsely separated into two phases of silicone and polyamide after polymerization. Washing was performed using toluene, but 3.2 g of polyamide aggregates were recovered over 200 μm, and no particles were obtained.

Comparative Example 2

Polymerization was carried out in the same manner as in Example 1 except that the polyethylene glycol was changed to polystyrene (manufactured by Aldrich Japan Inc., polystyrene Mw=280,000, molecular weight 278,400, SP value 16.6) and the water used for washing was changed to toluene. The liquid was separated into two phases at the start of polymerization, and remained coarsely separated into two phases of polystyrene and polyamide after polymerization. Washing was performed using toluene, but 3.3 g of polyamide aggregates were recovered over 200 μm, and no particles were obtained.

Comparative Example 3

Figure 5:
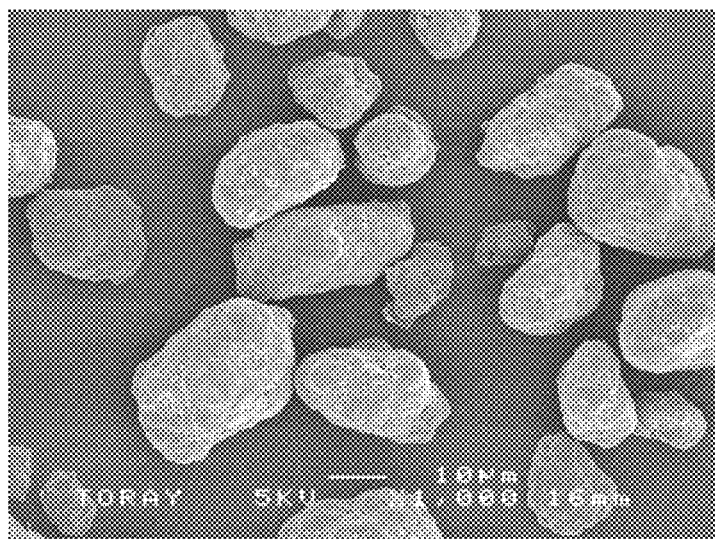
FIG. 5 is a scanning electron micrograph of polyamide fine particles obtained in Comparative Example 3.

To a reaction vessel equipped with a stirrer, 355 mL of liquid paraffin, 109 g of ε-caprolactam, 0.6 g of N,N'-ethylenebisadearaamide, and 0.5 g of fine silica were added and the mixture was stirred at 650 rpm. A vessel was heated to 100° C. and 31 mL of liquid paraffin was distilled off under a vacuum of 200 torr to remove residual moisture. After returning the system to atmospheric pressure, 0.5 g of sodium hydride was added under nitrogen inflow and the vessel was sealed, followed by stirring for 60 minutes. After raising the temperature to 110° C., the temperature was raised to 130° C. over 1 hour to start polymerization, and at the same time, 2.9 g of stearyl isocyanate was fed into the system through a pump at a rate of 0.02 g/min. The solution was suspended at the start of polymerization. The polymerization was continued for 2 hours after raising the temperature to 130° C. to complete the polymerization. After cooling the temperature to room temperature and washing liquid paraffin with toluene, 85 g of powder was obtained. The obtained powder had a melting point of 210° C. similar to that of polyamide 6, a crystallization temperature of 165° C., and a molecular weight of 34,400. From scanning electron microscope observation, polyamide 6 powder had an irregular fine particle shape, a number average particle size of 18.0 μm, a particle size distribution index of 1.30, and a sphericity of 68. FIG. 5 shows a scanning electron micrograph (magnification ×1,000) of the irregular polyamide 6 fine particles. Table 2 shows the properties of the obtained polyamide 6 fine particles.

Comparative Example 4

Polymerization was carried out in the same manner as in Example 10 except that water was not used. The liquid was separated into two phases at the start of polymerization, and after the polymerization, the liquid was roughly separated into two phases of polyamide 6 and polyethylene glycol, and polyamide 6 particles were not obtained.

Comparative Example 5

Polymerization was carried out in the same manner as in Example 11 except that water was not used. The liquid was separated into two phases at the start of polymerization, and after the polymerization, the liquid was roughly separated into two phases of polyamide 12 and polyethylene glycol, and polyamide 12 particles were not obtained.

INDUSTRIAL APPLICABILITY

The polyamide fine particles having a spherical shape, a smooth surface, a narrow particle size distribution, and a high crystallization temperature have high heat resistance and chemical resistance inherent in polyamides with a high crystallization temperature, as well as slipperiness due to a spherical and smooth surface with a narrow particle size distribution, and therefore can be suitably utilized for paints, adhesives, inks, toner light diffusing agents, liquid crystal spacers, matting agents, additives for polymer alloy, carriers for a variety of catalysts, chromatographic carriers, automotive parts, aircraft parts, electronic parts, cosmetic additives, medical carriers and the like. The polyamide fine particles can be applied to a high-performance paint that can be used under harsh conditions under which a conventional paint is unusable or the like due to heat resistance derived from a high crystallization temperature, a true spherical and smooth surface form, and a uniform particle diameter. Furthermore, in cosmetic applications, the amide group concentration in polyamide is increased so that the moisture retention is increased, and it is possible to achieve both a smooth and uniform feel and a moist feeling due to the true spherical shape and uniform particle size.

What is claimed is:

1. A method of producing polyamide fine particles comprising polymerizing a polyamide monomer (A) in the presence of a polymer (B) at a temperature equal to or higher than the crystallization temperature of a polyamide to be obtained, wherein the polyamide monomer (A) and the polymer (B) are homogeneously dissolved in the presence of water as a solvent (C) at the start of polymerization, and polyamide fine particles are precipitated after the polymerization.

2. The method according to claim 1, wherein the square of the solubility parameter difference between the monomer (A) and the polymer (B) is 0.1 to 25, and the square of the solubility parameter difference between polyamide and the polymer (B) is 0.1 to 16.

3. The method according to claim 1, wherein the polymer (B) does not comprise a polar group, or comprises any one selected from a hydroxyl group and a sulfhydryl group.

4. The method according to claim 1, wherein the polymer (B) is at least one selected from the group consisting of polyethylene glycol, polypropylene glycol, polytetramethylene glycol, polyethylene glycol-polypropylene glycol copolymer, and an alkyl ether thereof.

5. The method according to claim 1, wherein the weight average molecular weight of the polymer (B) is 500 to 500,000.

6. The method according to claim 2, wherein the polymer (B) does not comprise a polar group, or comprises any one selected from a hydroxyl group and a sulfhydryl group.

7. The method according to claim 3, wherein the polymer (B) is at least one selected from the group consisting of polyethylene glycol, polypropylene glycol, polytetramethylene glycol, polyethylene glycol-polypropylene glycol copolymer, and an alkyl ether thereof.

* * * * *